(12) United States Patent
Nakamura et al.

(10) Patent No.: US 11,912,870 B2
(45) Date of Patent: Feb. 27, 2024

(54) CURED PRODUCT OF RESIN COMPOSITION, LAMINATE, AND RESIN COMPOSITION

(71) Applicant: Nippon Sheet Glass Company, Limited, Tokyo (JP)

(72) Inventors: Koichiro Nakamura, Kanagawa (JP); Yuji Hiranuma, Tokyo (JP)

(73) Assignee: NIPPON SHEET GLASS COMPANY, LIMITED, Tokyo (JP)

( * ) Notice: Subject to any disclaimer, the term of this patent is extended or adjusted under 35 U.S.C. 154(b) by 600 days.

(21) Appl. No.: 17/041,775

(22) PCT Filed: Mar. 1, 2019

(86) PCT No.: PCT/JP2019/008152
§ 371 (c)(1),
(2) Date: Sep. 25, 2020

(87) PCT Pub. No.: WO2019/187988
PCT Pub. Date: Oct. 3, 2019

(65) Prior Publication Data
US 2021/0024752 A1    Jan. 28, 2021

(30) Foreign Application Priority Data
Mar. 28, 2018  (JP) ................................ 2018-061295

(51) Int. Cl.
| | |
|---|---|
| *C08G 59/30* | (2006.01) |
| *C08G 59/32* | (2006.01) |
| *C08G 59/68* | (2006.01) |
| *C08L 63/00* | (2006.01) |
| *C08L 83/06* | (2006.01) |
| *B32B 27/38* | (2006.01) |
| *B32B 27/06* | (2006.01) |
| *B32B 27/28* | (2006.01) |
| *C08G 59/26* | (2006.01) |
| *C08G 65/08* | (2006.01) |
| *C08G 65/18* | (2006.01) |

(52) U.S. Cl.
CPC .............. *C08L 83/06* (2013.01); *B32B 27/06* (2013.01); *B32B 27/283* (2013.01); *B32B 27/38* (2013.01); *C08G 59/26* (2013.01); *C08G 59/306* (2013.01); *C08G 65/08* (2013.01); *C08G 65/18* (2013.01); *B32B 2250/02* (2013.01); *B32B 2363/00* (2013.01); *B32B 2383/00* (2013.01); *C08L 2205/02* (2013.01); *C08L 2205/03* (2013.01)

(58) Field of Classification Search
CPC .. C08G 59/306; C08G 59/3281; C08G 59/68; C08L 63/00; C08L 83/04; C08L 83/06

USPC ......... 523/433; 525/476, 477, 523, 524, 525
See application file for complete search history.

(56) References Cited

U.S. PATENT DOCUMENTS

| | | | |
|---|---|---|---|
| 2003/0059618 A1* | 3/2003 | Takai ..................... | C08G 59/24 428/413 |
| 2009/0256171 A1 | 10/2009 | Takei et al. | |
| 2010/0006887 A1* | 1/2010 | Takei ..................... | C08G 59/24 257/E33.059 |
| 2011/0223420 A1* | 9/2011 | Ichiroku ................. | C08L 71/00 523/435 |
| 2016/0311968 A1 | 10/2016 | Fujikawa et al. | |

FOREIGN PATENT DOCUMENTS

| | | | |
|---|---|---|---|
| JP | 2004238589 A | * | 8/2004 |
| JP | 2004314468 | | 11/2004 |
| JP | 2005089601 A | * | 4/2005 |
| JP | 2005206787 | | 8/2005 |
| JP | 2006342276 A | | 12/2006 |
| JP | 2010006971 | | 1/2010 |
| JP | 2011079927 | | 4/2011 |
| JP | 2015168153 | | 9/2015 |
| JP | 5852014 | | 2/2016 |
| JP | 6204499 | | 9/2017 |
| WO | 2008081836 | | 7/2008 |
| WO | 2008081900 | | 7/2008 |
| WO | 2013187507 | | 12/2013 |
| WO | 2015029859 | | 3/2015 |

OTHER PUBLICATIONS

Machine translation of JP-2004238589-A (no date).*
Machine translation of JP-2005089601-A (no date).*
Extended European Search Report issued for European Patent Application No. 19775406.2, dated Nov. 24, 2021, 8 pages.
International Search Report and Written Opinion issued for International Patent Application No. PCT/JP2019/008152, dated May 21, 2019, 11 pages including English translation of Search Report.

* cited by examiner

*Primary Examiner* — Michael J Feely
(74) *Attorney, Agent, or Firm* — Hamre, Schumann, Mueller & Larson, P.C.

(57) ABSTRACT

A cured product of a resin composition according to the present invention includes at least silsesquioxane. When the average thermal expansion coefficient of the cured product at 30 to 200° C. is expressed as $\alpha 1$ [$K^{-1}$], at least one of requirements $\alpha 1/\alpha 2 \geq 10$ and $(\alpha 1-\alpha 2)^2 \times 10^8 \geq 0.4$ is satisfied, where a reference value $\alpha 2$ is $350 \times 10^{-6}$ [$K^{-1}$] or less. In the cured product, an absorbance derived from a siloxane bond, an absorbance derived from a hydrocarbon group, and an absorbance derived from a hydroxy group are respectively expressed as Ia, Ib, and Ic, the absorbances being determined by attenuated total reflection using a Fourier transform infrared spectrophotometer. In this case, requirements $0.09 \leq Ia/Ib \leq 3.0$ and $0.04 \leq Ic/Ib \leq 1.0$ are satisfied.

13 Claims, 5 Drawing Sheets

CURED PRODUCT OF RESIN COMPOSITION, LAMINATE, AND RESIN COMPOSITION

TECHNICAL FIELD

The present invention relates to a cured product of a resin composition, a laminate, and a resin composition.

BACKGROUND ART

Materials including a cured product of a silsesquioxane-including resin composition have been known. For example, Patent Literature 1 describes a resin film including a thermoplastic resin layer and a curable resin layer. The curable resin layer is formed by curing, for example, a curable resin composition including a polyhedral oligomeric silsesquioxane-based oligomer.

Patent Literature 2 describes a transparent composite material composed of: a curable resin composition including silsesquioxane having a cyclic ether group such as an epoxy group; and glass fibers.

Patent Literature 3 describes a transparent composite composition composed of: a transparent resin including an alicyclic epoxy resin and silsesquioxane having an oxetanyl group as components; and a glass filler.

Patent Literature 4 describes a specific curable epoxy resin composition as a resin composition for encapsulating an optical semiconductor. In Patent Literature 4, optical semiconductor equipment including an optical semiconductor device encapsulated with a cured product of the curable epoxy resin composition is subjected to a thermal shock test in the temperature range of −40 to 100° C.

Patent Literature 5 describes a curable composition for lens formation including at least a given alicyclic epoxy compound, a cationic polymerization initiator, a given polysiloxane, and a siloxane compound having 2 or more epoxy groups per molecule. In Patent Literature 5, cured products of curable compositions for lens formation according to Examples are subjected to a heat resistance test in the temperature range of −30 to 270° C. and the rate of yellowing is calculated.

CITATION LIST

Patent Literature

Patent Literature 1: JP 2015-168153 A
Patent Literature 2: JP 2011-79927 A
Patent Literature 3: JP 2005-206787 A
Patent Literature 4: JP 5852014 B2
Patent Literature 5: JP 6204499 B2

SUMMARY OF INVENTION

Technical Problem

In Patent Literatures 1 to 5, unlikelihood of shrinkage and unlikelihood of cracking of a cured product of each resin composition are not evaluated by exposing a laminate composed of a substrate having a low average thermal expansion coefficient and the cured product to a high temperature (e.g., 260° C. or more). Therefore, the present invention provides a cured product of a resin composition, the cured product being less likely to shrink and crack at a high temperature when stacked on a substrate having a low average thermal expansion coefficient. The present invention also provides a laminate composed of: a substrate having a low average thermal expansion coefficient; and the cured product. The present invention further provides a resin composition for forming the cured product.

Solution to Problem

The present invention provides a cured product of a resin composition, the cured product including at least silsesquioxane, wherein when the average thermal expansion coefficient of the cured product at 30 to 200° C. is expressed as $\alpha 1$ $[K^{-1}]$, at least one of requirements $\alpha 1/\alpha 2 \geq 10$ and $(\alpha 1-\alpha 2)^2 \times 10^8 \geq 0.4$ is satisfied, where a reference value $\alpha 2$ is $350 \times 10^{-6}$ $[K^{-1}]$ or less, and requirements $0.09 \leq Ia/Ib \leq 3.0$ and $0.04 \leq Ic/Ib \leq 1.0$ are satisfied when an absorbance derived from a siloxane bond in which two silicon atoms are bonded to one oxygen atom, an absorbance derived from a hydrocarbon group, and an absorbance derived from a hydroxy group are respectively expressed as Ia, Ib, and Ic, the absorbances being determined by attenuated total reflection using a Fourier transform infrared spectrophotometer.

The present invention also provides a laminate including:

a substrate; and the above cured product stacked on the substrate, wherein when the average thermal expansion coefficient of the cured product at 30 to 200° C. is expressed as $\alpha 1$ $[K^{-1}]$ and the average thermal expansion coefficient of the substrate at 30 to 200° C. is expressed as $\alpha 3$ $[K^{-1}]$, $\alpha 3 \leq 350 \times 10^{-6}$ $[K^{-1}]$ and at least one of requirements $\alpha 1/\alpha 3 \geq 10$ and $(\alpha 1-\alpha 3)^2 \times 10^8 \geq 0.4$ is satisfied.

The present invention further provides a resin composition including at least silsesquioxane, wherein when the average thermal expansion coefficient of a cured product of the resin composition at 30 to 200° C. is expressed as $\alpha 1$ $[K^{-1}]$, at least one of requirements $\alpha 1/\alpha 2 \geq 10$ and $(\alpha 1-\alpha 2)^2 \times 10^8 \geq 0.4$ is satisfied, where a reference value $\alpha 2$ is $350 \times 10^{-6}$ $[K^{-1}]$ or less, and in the cured product, requirements $0.09 \leq Ia/Ib \leq 3.0$ and $0.04 \leq Ic/Ib \leq 1.0$ are satisfied when an absorbance derived from a siloxane bond in which two silicon atoms are bonded to one oxygen atom, an absorbance derived from a hydrocarbon group, and an absorbance derived from a hydroxy group are respectively expressed as Ia, Ib, and Ic, the absorbances being determined by attenuated total reflection using a Fourier transform infrared spectrophotometer.

Advantageous Effects of Invention

The above cured product is less likely to shrink and crack at a high temperature when stacked on a substrate having a low average thermal expansion coefficient. In the above laminate, the cured product is less likely to shrink and crack at a high temperature. Moreover, the above resin composition can form such a cured product.

DESCRIPTION OF EMBODIMENTS

Hereinafter, embodiments of the present invention will be described with reference to the drawings. The following description is directed to some examples of the present invention, and the present invention is not limited by those described hereinafter.

Figure 1:
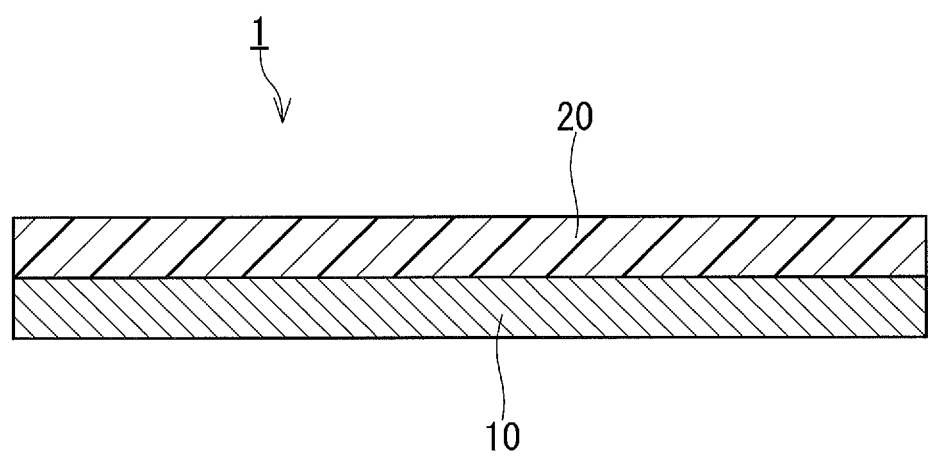
FIG. 1 is a cross-sectional view schematically showing a structure of an example of a laminate according to the present invention.

As shown in FIG. 1, a laminate 1 includes a substrate 10 and a cured product 20 of a resin composition. The cured product 20 includes at least silsesquioxane. The average thermal expansion coefficient of the cured product 20 at 30 to 200° C. is expressed as $\alpha 1$ [$K^{-1}$]. In this case, at least one of requirements $\alpha 1/\alpha 2 \geq 10$ and $(\alpha 1-\alpha 2)^2 \times 10^8 \geq 0.4$ is satisfied, where a reference value $\alpha 2$ is $350 \times 10^{-6}$ [$K^{-1}$] or less. The average thermal expansion coefficient of the substrate 10 at 30 to 200° C. is expressed as $\alpha 3$ [$K^{-1}$]. $\alpha 3$ satisfies a requirement $\alpha 3 \leq 350 \times 10^{-6}$ [$K^{-1}$], and $\alpha 2$ is determined, for example, by reference to $\alpha 3$. For example, $\alpha 2 = \alpha 3$. In the laminate 1, at least one of requirements $\alpha 1/\alpha 3 \geq 10$ and $(\alpha 1-\alpha 3)^2 \times 10^8 \geq 0.4$ is satisfied. In the cured product 20, an absorbance derived from a siloxane bond in which two silicon atoms are bonded to one oxygen atom, an absorbance derived from a hydrocarbon group, and an absorbance derived from a hydroxy group are respectively expressed as Ia, Ib, and Ic, the absorbances being determined by ATR using a Fourier transform infrared spectrophotometer. In this case, requirements $0.09 \leq Ia/Ib \leq 3.0$ and $0.04 \leq Ic/Ib \leq 1.0$ are satisfied. Herein, Ia/Ib is also called "inorganic-organic parameter (IO)" and Ic/Ib is also called "hydrophilicity parameter (H)". Ia, Ib, and Ic can be determined, for example, according to methods described in EXAMPLES from an absorption spectrum obtained by ATR.

The resin composition for forming the cured product 20 includes at least silsesquioxane serving as a precursor of the cured product 20.

The average thermal expansion coefficient $\alpha 1$ of the cured product 20 at 30 to 200° C. can be determined according to the test method specified in, for example, Japanese Industrial Standards (JIS) K7197-1991. The average thermal expansion coefficient $\alpha 3$ of the substrate 10 at 30 to 200° C. can be determined according to the test method specified in, for example, Japanese Industrial Standards (JIS) R3102-1995.

The cured product 20 includes, for example, an inorganic component having a siloxane bond (Si—O—Si) in the silsesquioxane and an organic component having a bond such as an ether bond (C—O—C). For example, when the silsesquioxane includes a given polymerizable functional group, the organic component includes a component having a bond formed by polymerization involving the functional group. The higher the content of the inorganic component having a siloxane bond (Si—O—Si) and included in the cured product 20 is, the greater the inorganic-organic parameter (IO) is. On the other hand, the higher the content of the organic component having a bond such as an ether bond (C—O—C) is, the smaller the inorganic-organic parameter (IO) is. When the content of the inorganic component in the cured product is high, the heat resistance of the cured product increases to reduce thermal shrinkage induced by thermal decomposition of the cured product at a high temperature (e.g., 260° C. or more). However, too high a content of the inorganic component in the cured product decreases the flexibility of the cured product and leads to brittleness of the cured product. Such a cured product is likely to crack by exposure of the cured product to a high temperature. Especially when the difference between the average thermal expansion coefficient of the substrate and the average thermal expansion coefficient of the cured product is large (e.g., when $\alpha 1/\alpha 2 \geq 10$ or $(\alpha 1-\alpha 2)^2 \times 10^8 \geq 0.4$ is satisfied), the cured product is likely to crack by exposure of the cured product to a high temperature. On the other hand, when the content of the organic component in the cured product is high, the cured product has a high flexibility and is less likely to crack by exposure of the cured product to a high temperature. However, too high a content of the organic component in the cured product makes it likely that the cured product shrinks at a high temperature due to thermal decomposition. Therefore, the present inventors focused on the inorganic-organic parameter (IO) for the cured product and went through much trial and error to achieve a cured product having a desired heat resistance and a desired crack resistance. That has eventually led the present inventors to newly find out that when the inorganic-organic parameter (IO) is 0.09 or more and 3.0 or less for the cured product 20, the cured product 20 shows slight (e.g., 5% or less) thermal shrinkage and is less likely to crack by exposure of the cured product 20 to a high temperature.

The more hydroxy groups (OH groups) there are in the cured product, the greater the hydrophilicity parameter (H) is. A hydroxy group strengthens a bond between the silsesquioxane and another component by hydrogen bonding. For example, when the resin composition includes an alicyclic epoxide, a hydroxy group strengthens a bond between the silsesquioxane and an oligomer or a polymer formed by polymerization of the alicyclic epoxide. Moreover, a hydroxy group gives the cured product a high adhesion to a glass substrate by forming a firm hydrogen bond with a silanol group of the glass substrate. Therefore, when the cured product is stacked on a substrate, such as glass, having a small thermal expansion coefficient and is then exposed to a high temperature, the cured product is unlikely to be separated from the substrate. However, too many hydroxy groups in the cured product decreases the relative amount of the component having a bond such as an ether bond (C—O—C) or the component having a siloxane bond (Si—O—Si), and that makes it difficult to enhance the mechanical strength of the cured product. Additionally, too many hydroxy groups in the cured product can cause progression of a dehydration reaction ($2C—OH \rightarrow C—O—C+H_2O$ or $2Si—OH \rightarrow Si—O-Si+H_2O$) on heating, resulting in a crack due to shrinkage of the cured product or evaporation of generated water. Therefore, the present inventors also focused on the hydrophilicity parameter (H) for the cured product and went through much trial and error to achieve a cured product having a desired heat resistance and a desired crack resistance. That has eventually led the present inventors to newly find out that when the hydrophilicity parameter (H) is 0.04 or more and 1.0 or less for the cured product 20, the cured product 20 is less likely to be separated from the substrate 10, shows slight (e.g., 5% or less) thermal shrinkage, and is less likely to crack by exposure of the cured product 20 to a high temperature.

The cured product 20 desirably further satisfies a requirement $0.06 \leq Ic/Ib \leq 0.08$ or $0.09 \leq Ic/Ib \leq 0.10$. In this case, the cured product 20 shows slight thermal shrinkage and is less likely to crack by exposure of the cured product 20 to a 400° C. or 360° C. environment.

The silsesquioxane included in the cured product 20 is, for example, a polymer of silsesquioxane having an oxetanyl group. In this case, the silsesquioxane included in the resin composition has an oxetanyl group. As represented by the equation (1), polymerization of an oxetanyl group gives a polymer having an ether bond (C—O—C).

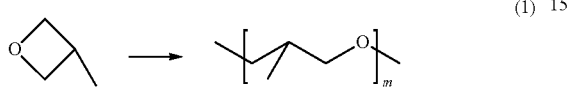
(1)

When the silsesquioxane included in the resin composition has an oxetanyl group, a functional group including an oxetanyl group bonded to a silicon atom desirably includes 16 or less carbon atoms. In this case, the content of the organic component in the cured product 20 is likely to decrease, which increases the content of the inorganic component formed of a siloxane bond (Si—O—Si) and makes it likely that the cured product 20 has a desired heat resistance.

The silsesquioxane has at least one of, for example, a complete cage structure represented by the following formula (1-1), an incomplete cage structure represented by the following formula (1-2), a ladder structure represented by the following formula (1-3), and a random structure represented by the following formula (1-4). As represented by the formula (1-5), the silsesquioxane may have a silicone chain. In this case, the general formula of the silsesquioxane is expressed as $(RSiO_{3/2})_m[(CH_3)_2SiO]_n$. m and n are each an integer of 2 or more. In the formulae (1-1) to (1-5), R can be, for example, an oxetanyl group represented by the formula (1-6).

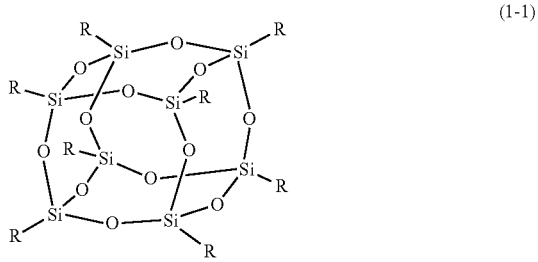
(1-1)

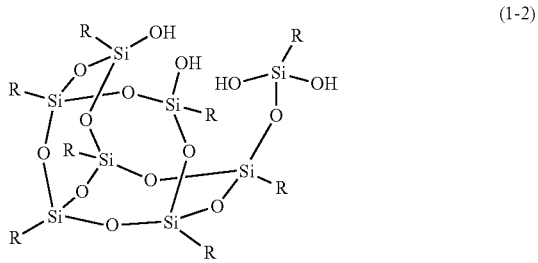
(1-2)

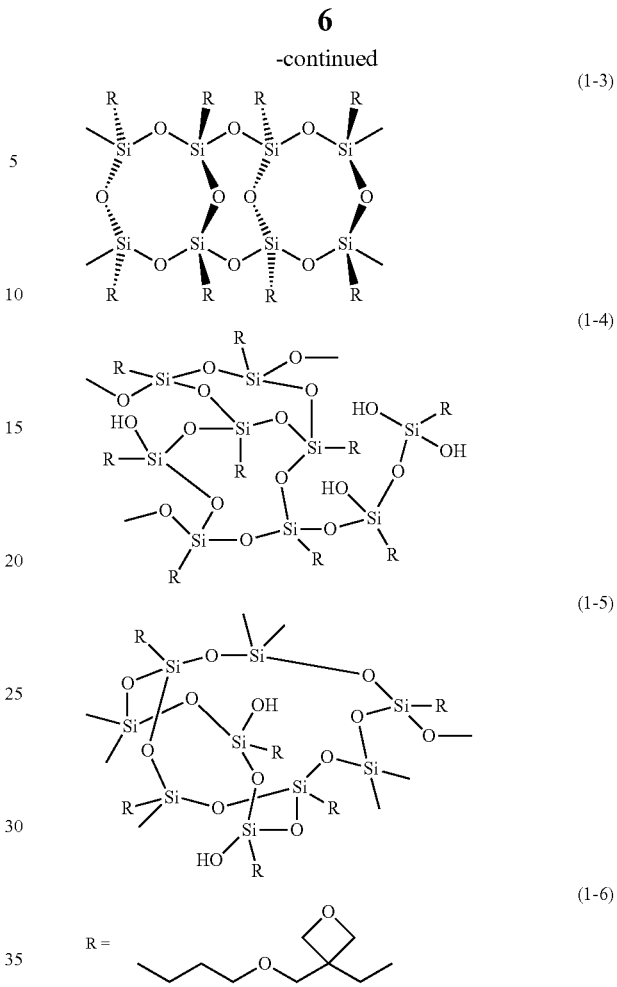

When the silsesquioxane included in the resin composition has a silicone chain, an increase in the content of the organic component in the cured product 20 can be reduced and flexibility can be imparted to the inorganic component. As a result, when the cured product 20 is exposed to a high temperature, thermal shrinkage induced by thermal decomposition of the organic component can be reduced and occurrence of a crack can be prevented.

In the cured product 20, a relationship $Ia/Id \geq 45$ is desirably further satisfied when an absorbance derived from an oxetanyl group and determined by ATR using Fourier transform infrared spectrophotometer is expressed as Id. Herein, Ia/Id is also called "first polymerization degree parameter (C1)". Id can be determined, for example, according to a method described in EXAMPLES from an absorption spectrum obtained by ATR. The smaller the content of the unreacted oxetanyl group included in the cured product 20 is, the greater the first polymerization degree parameter (C1) is. When the first polymerization degree parameter (C1) is 45 or more, the degree of polymerization of the polymer of the silsesquioxane having an oxetanyl group is high in the cured product 20 and the content of an unreacted low-boiling-point component included in the cured product 20 is small. As a result, when the cured product 20 is exposed to a high temperature, the cured product 20 is reduced little in weight and shows slight thermal shrinkage by exposure of the cured product 20 to a high temperature. Additionally, the cured product 20 has a high mechanical strength and is less likely to crack.

In the cured product 20, a relationship Ia/Id≥47 is desirably further satisfied. In this case, the cured product 20 shows slight thermal shrinkage and is less likely to crack by exposure of the cured product 20 to a 400° C. environment.

In the cured product 20, a relationship Ie/Id≥59 is desirably further satisfied when an absorbance derived from a bond between a silicon atom and a non-reactive functional group and determined by ATR using a Fourier transform infrared spectrophotometer is expressed as Ie. Ie can be determined, for example, according to a method described in EXAMPLES from an absorption spectrum obtained by ATR. In this case, the cured product 20 shows slight thermal shrinkage and is less likely to crack by exposure of the cured product 20 to a 400° C. environment. Herein, Ie/Id is also called "second polymerization degree parameter (C2)".

The cured product 20 desirably further includes an epoxy resin. In this case, the resin composition further includes an epoxide. The epoxide included in the resin composition is, for example, an alicyclic epoxide represented by the following formula (2a). In the cured product 20, the epoxy resin is formed by polymerization of an epoxy group of the epoxide included in the resin composition.

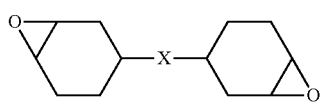

(2a)

As represented by the following equation (2b), the epoxy group changes its ether bond to (C—O—C) by a polymerization reaction, and, in the cured product 20, the epoxy resin is formed as a polymer of the epoxide. Thus, the epoxy resin is the organic component in the cured product 20. In the case where the resin composition includes the silsesquioxane having an oxetanyl group, a copolymerization reaction between the oxetanyl group and the epoxy group can occur. In this case, a copolymer having, as structural units, the silsesquioxane having an oxetanyl group and the epoxide can be a part of the cured product 20.

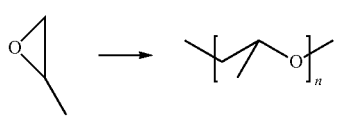

(2b)

The resin composition may include, for example, at least one of alicyclic epoxides represented by the following formulae (2-1) to (2-9). In the formula (2-9), n is an integer of 2 or more. The number of carbon atoms included per molecule in the alicyclic epoxide included in the resin composition is desirably 20 or less and more desirably 15 or less in terms of decreasing the content of the organic component in the cured product 20 and enhancing the heat resistance of the cured product 20. Therefore, the alicyclic epoxide included in the resin composition is at least one selected from the group consisting of, for example, the alicyclic epoxide (number of carbon atoms: 12) represented by the formula (2-1), the alicyclic epoxide (number of carbon atoms: 13) represented by the formula (2-2), the alicyclic epoxide (number of carbon atoms: 14) represented by the formula (2-3), the alicyclic epoxide (number of carbon atoms: 15) represented by the formula (2-4), and the alicyclic epoxide (number of carbon atoms: 14) represented by the formula (2-5).

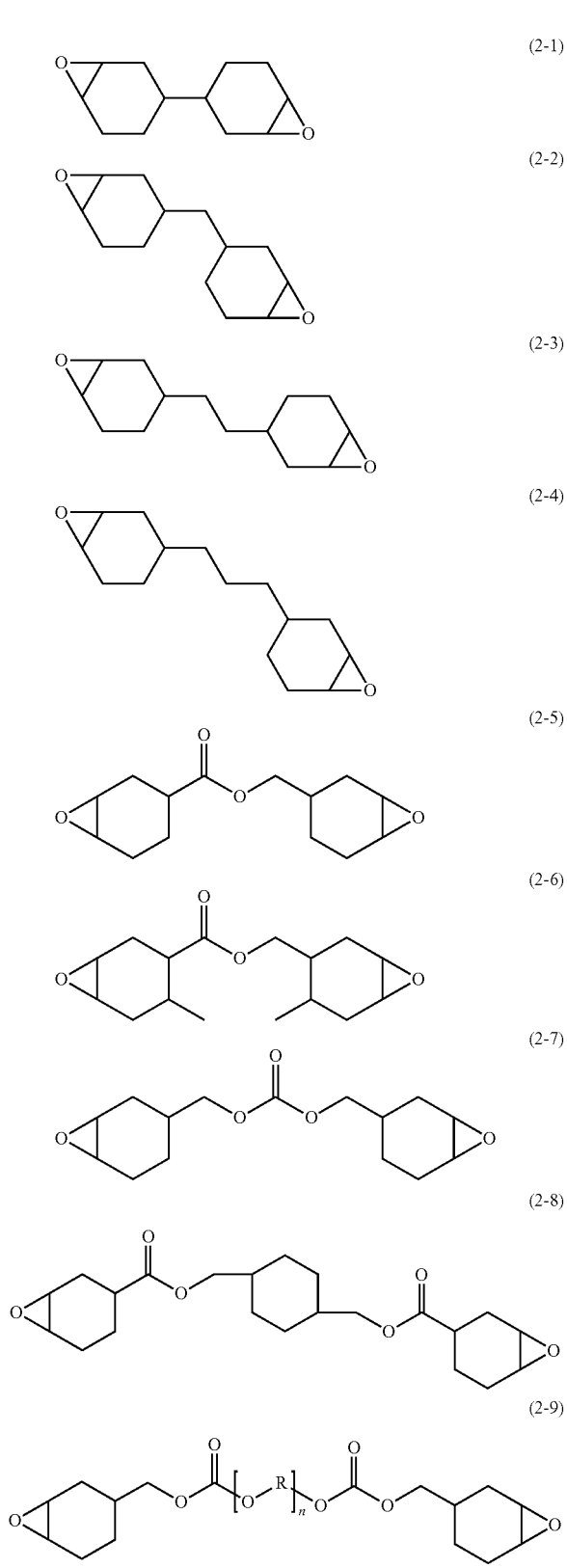

The resin composition may include an alicyclic epoxide having a silicone chain. In this case, an increase in the content of the organic component in the cured product 20 can be reduced and flexibility can be imparted to the inorganic component. As a result, when the cured product 20 is exposed to a high temperature, thermal shrinkage induced by thermal decomposition of the organic component can be reduced and occurrence of a crack can be prevented. The resin composition may include, for example, at least one of alicyclic epoxides represented by the following formulae (3-1) to (3-4).

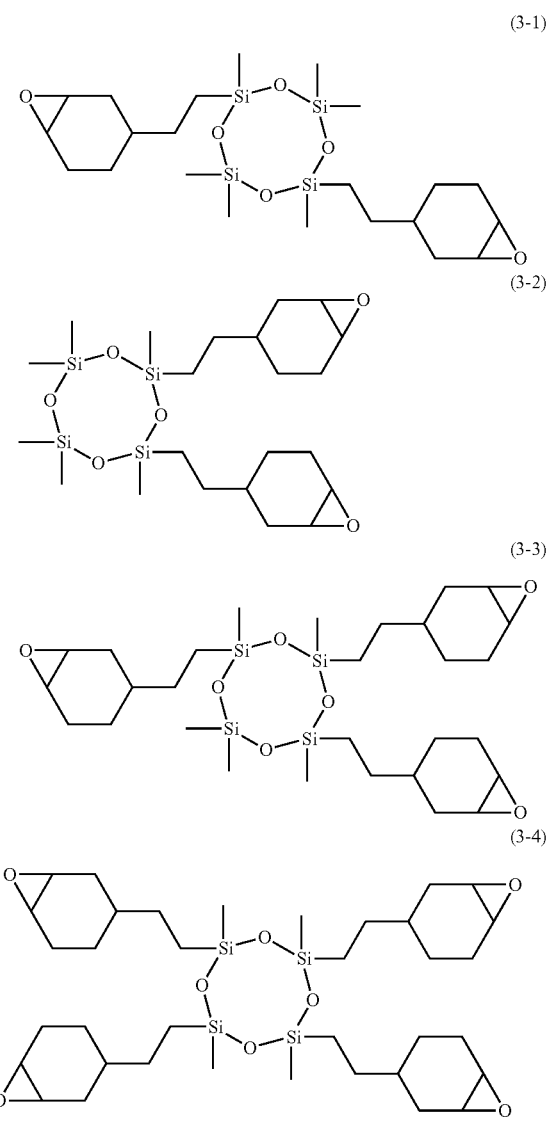

In the resin composition, the ratio (We/Ws) of the weight (We) of the epoxide to the weight (Ws) of the silsesquioxane is, for example, 0.005 to 5, desirably 0.015 to 4.5, and more desirably 0.05 to 3. When We/Ws is adjusted to this range, ensuring of heat resistance by the inorganic component having a siloxane bond (Si—O—Si) in polysilsesquioxane and crack prevention by the organic component are both easily achieved at the same time. When We/Ws is 0.015 to 4.5, the cured product shows slight thermal shrinkage and is less likely to crack by exposure of the cured product 20 to a 360° C. environment. When We/Ws is 0.05 to 3, the cured product shows slight thermal shrinkage and is less likely to crack by exposure of the cured product 20 to a 400° C. environment.

The epoxide in the resin composition includes, for example, at least one of a first alicyclic epoxide having no silicone chain and a second alicyclic epoxide having a silicone chain. In addition, the silsesquioxane in the resin composition may include a first silsesquioxane having a silicone chain including a polymerizable functional group. The polymerizable functional group is, for example, an oxetanyl group. In this case, a composition ratio of the polymerizable functional group of the first silsesquioxane to the first epoxy group of the first alicyclic epoxide to the second epoxy group of the second alicyclic epoxide is desirably in an area surrounded by five line segments connecting points A, F, G, H, and I in this order in a ternary diagram on a mol % basis. At the point A, the content of the polymerizable functional group is 95%, the content of the first epoxy group is 0%, and the content of the second epoxy group is 5%. At the point F, the content of the polymerizable functional group is 95%, the content of the first epoxy group is 5%, and the content of the second epoxy group is 0%. At the point G, the content of the polymerizable functional group is 0%, the content of the first epoxy group is 80%, and the content of the second epoxy group is 0%. At the point H, the content of the polymerizable functional group is 20%, the content of the first epoxy group is 20%, and the content of the second epoxy group is 60%. At the point I, the content of the polymerizable functional group is 40%, the content of the first epoxy group is 0%, and the content of the second epoxy group is 60%.

When the resin composition has the composition ratio of the polymerizable functional group of the first silsesquioxane to the first epoxy group of the first alicyclic epoxide to the second epoxy group of the second alicyclic epoxide in this range, the cured product 20 shows slight thermal shrinkage and is less likely to crack by exposure of the cured product 20 to a 360° C. environment.

The composition ratio of the polymerizable functional group of the first silsesquioxane to the first epoxy group of the first alicyclic epoxide to the second epoxy group of the second alicyclic epoxide is more desirably in an area surrounded by five line segments connecting points A, B, C, D, and E in this order in a ternary diagram on a mol % basis. At the point B, the content of the polymerizable functional group is 45%, the content of the first epoxy group is 45%, and the content of the second epoxy group is 10%. At the point C, the content of the polymerizable functional group is 25%, the content of the first epoxy group is 50%, and the content of the second epoxy group is 25%. At the point D, the content of the polymerizable functional group is 25%, the content of the first epoxy group is 25%, and the content of the second epoxy group is 50%. At the point E, the content of the polymerizable functional group is 80%, the content of the first epoxy group is 0%, and the content of the second epoxy group is 20%. When the resin composition has the composition ratio of the polymerizable functional group of the first silsesquioxane to the first epoxy group of the first alicyclic epoxide to the second epoxy group of the second alicyclic epoxide in this range, the cured product 20 shows slight thermal shrinkage and is less likely to crack by exposure of the cured product 20 to a 400° C. environment.

When the silsesquioxane in the resin composition includes the first silsesquioxane, the requirement $0.06 \leq Ic/Ib \leq 0.08$ is desirably satisfied in the cured product 20. In this case, the cured product 20 shows slight thermal shrinkage and is less likely to crack by exposure of the cured product 20 to a 400° C. environment.

The epoxide in the resin composition includes, for example, at least one of the first alicyclic epoxide having no silicone chain and the second alicyclic epoxide having a silicone chain. In addition, the silsesquioxane in the resin composition may include a second silsesquioxane having a polymerizable functional group and no silicone chain. The polymerizable functional group is, for example, an oxetanyl group. In this case, a composition ratio of the polymerizable functional group of the second silsesquioxane to the first epoxy group of the first alicyclic epoxide to the second epoxy group of the second alicyclic epoxide is desirably in an area surrounded by five line segments connecting points J, K, L, M, and N in this order in a ternary diagram on a mol % basis. At the point J, the content of the polymerizable functional group is 80%, the content of the first epoxy group is 20%, and the content of the second epoxy group is 0%. At the point K, the content of the polymerizable functional group is 20%, the content of the first epoxy group is 80%, and the content of the second epoxy group is 0%. At the point L, the content of the polymerizable functional group is 20%, the content of the first epoxy group is 20%, and the content of the second epoxy group is 60%. At the point M, the content of the polymerizable functional group is 30%, the content of the first epoxy group is 0%, and the content of the second epoxy group is 70%. At the point N, the content of the polymerizable functional group is 70%, the content of the first epoxy group is 0%, and the content of the second epoxy group is 30%. When the resin composition has the composition ratio of the polymerizable functional group of the second silsesquioxane to the first epoxy group of the first alicyclic epoxide to the second epoxy group of the second alicyclic epoxide in this range, the cured product 20 shows slight thermal shrinkage and is less likely to crack by exposure of the cured product 20 to a 360° C. environment.

When the silsesquioxane in the resin composition includes the second silsesquioxane, the requirement $0.09 \leq Ic/Ib \leq 0.10$ is desirably satisfied in the cured product 20. In this case, the cured product shows slight thermal shrinkage and is less likely to crack by exposure of the cured product 20 to a 360° C. environment.

The cured product 20 can have a variety of shapes. The cured product 20 may be a flat film or may have an uneven structure. The structure of the cured product 20 may be a combination of a flat structure and an uneven structure.

The cured product 20 can be formed by curing the resin composition. The method for curing the resin composition is, for example, heat curing or curing by ultraviolet irradiation. When the resin composition is cured, a polymerization reaction of the polymerizable functional group, such as an oxetanyl group, included in polysilsesquioxane or a polymerization reaction of the epoxy group of the epoxide occurs. The resin composition may further include a polymerization initiator for such a polymerization reaction.

Examples of the polymerization initiator included in the resin composition include photopolymerization initiators such as cationic photopolymerization initiators and thermal polymerization initiators such as thermal cationic polymerization initiators. Examples of the cationic photopolymerization initiator include diazonium salt compounds, sulfonium salt compounds, phosphonium salt compounds, selenium salt compounds, oxonium salt compounds, ammonium salt compounds, bromine salt compounds, and iodonium salt compounds. Specific examples of the cationic photopolymerization initiator include (i) (4-hydroxyphenyl) methylbenzylsulfonium tetrakis(pentafluorophenyl)borate, 4-(4-biphenylylthio)phenyl-4-biphenylylphenylsulfonium tetrakis(pentafluorophenyl)borate, 4-(phenylthio)phenyldiphenylsulfonium phenyltris(pentafluorophenyl)borate, [4-(4-biphenylylthio)phenyl]-4-biphenylylphenylsulfonium phenyltris(pentafluorophenyl)borate, diphenyl[4-(phenylthio)phenyl]sulfonium tris(pentafluoroethyl)trifluorophosphate, diphenyl[4-(phenylthio)phenyl]sulfonium tetrakis(pentafluorophenyl)borate, diphenyl[4-(phenylthio)phenyl]sulfonium hexafluorophosphate, 4-(4-biphenylylthio) phenyl-4-biphenylylphenylsulfonium tris(pentafluoroethyl)trifluorophosphate, bis[4-(diphenylsulfonio)phenyl]sulfide phenyltris(pentafluorophenyl)borate, [4-(2-thioxanethonylthio)phenyl]phenyl-2-thioxanethonylsulfonium phenyltris(pentafluorophenyl)borate, and 4-(phenylthio)phenyldiphenylsulfonium hexafluoroantimonate, (ii) "Cyracure UVI-6970", "Cyracure UVI-6974", "Cyracure UVI-6990", and "Cyracure UVI-950" manufactured by Union Carbide Corporation, USA, (iii) "Irgacure 250", "Irgacure 261", and "Irgacure 264" manufactured by Ciba Specially Chemicals, (iv) "SP-150", "SP-151", "SP-170", and "Optomer SP-171" manufactured by ADEKA CORPORATION, (v) "CG-24-61" manufactured by Ciba Specially Chemicals, (vi) "DAICAT II" manufactured by Daicel Corporation, (vii) "UVAC 1590" and "UVAC 1591" manufactured by Daicel-Cytec Co., Ltd., (viii) "CI-2064", "CI-2639", "CI-2624", "CI-2481", "CI-2734", "CI-2855", "CI-2823", "CI-2758", and "CIT-1682" manufactured by Nippon Soda Co., Ltd., (ix) "PI-2074" (tetrakis(pentafluorophenyl borate)toluyl cumyl iodonium salt) manufactured by Rhodia, Inc., (x) "FFC509" manufactured by 3M, (xi) "BBI-102", "BBI-101", "BBI-103", "MPI-103", "TPS-103", "MDS-103", "DTS-103", "NAT-103", and "NDS-103" manufactured by Midori Kagaku Co., Ltd., (xii) "CD-1010", "CD-1011", and "CD-1012" manufactured by Sartomer USA, LLC, and (xiii) "CPI-100P", "CPI-101A", "CPI-200K", "CPI-210S", "CPI-310B", and "CPI-410PG" manufactured by San-Apro Ltd.

The thermal cationic polymerization initiator is a compound from which cationic species are generated by heating to initiate a curing reaction of a cationic curable compound. The thermal cationic polymerization initiator is composed of a cation part that absorbs heat and an anion part that is a source of an acid. The thermal cationic polymerization initiator is, for example, a sulfonium salt compound or an iodonium salt compound. Specific examples of the thermal cationic polymerization initiator include 4-hydroxyphenyl-methyl-benzylsulfonium phenyltris(pentafluorophenyl)borate, 4-hydroxyphenyl-methyl-(2-methylbenzyl)sulfonium phenyltris(pentafluorophenyl)borate, 4-hydroxyphenyl-methyl-1-naphthylmethylsulfonium phenyltris(pentafluorophenyl)borate, and p-methoxycarbonyloxyphenyl-benzyl-methylsulfonium phenyltris(pentafluorophenyl)borate.

The resin composition may include one cationic polymerization initiator or may include two or more cationic polymerization initiators. The content of the cationic polymerization initiator in the resin composition is desirably 0.01 to 20 parts by weight, more desirably 0.07 to 15 parts by weight, even more desirably 0.05 to 10 parts by weight, and particularly desirably 0.1 to 5 parts by weight, for example, with respect to 100 parts by weight of a cationic curable compound (e.g., all cationic curable compounds such as an oxetanyl-containing compound and an epoxy compound) included in a curable composition. When the content of the cationic polymerization initiator in the resin composition is in this range, a cured product having excellent heat resistance and excellent optical properties can be obtained.

The resin composition may include an additive, such as a dye, for adjusting optical properties, physical properties, or chemical properties depending on the intended use of the cured product 20.

The substrate 10 is not limited to a particular substrate as long as at least one of the requirements $\alpha 1/\alpha 3 \geq 10$ and $(\alpha 1 - \alpha 3)^2 \times 10^8 \geq 0.4$ is satisfied. Examples of the material of the substrate 10 include glass, metals, inorganic materials, organic-inorganic hybrid materials, and organic materials such as plastics. When the substrate 10 is a glass substrate, examples of the material of the substrate 10 include borosilicate glass (D263 T eco; average thermal expansion coefficient at 20 to 300° C.: 7.2 parts per million (ppm) $K^{-1}$), quartz glass (average thermal expansion coefficient at 20 to 320° C.: 0.55 ppm $K^{-1}$), and float glass (average thermal expansion coefficient at 20 to 300° C.: 9 ppm $K^{-1}$). The material of the substrate 10 may be a zero expansion glass having an average thermal expansion coefficient of 0 at 0 to 50° C. or a negative expansion material having a negative average thermal expansion coefficient at 1 to 30° C. Examples of the zero expansion glass include Zerodur (registered trademark; average thermal expansion coefficient at 0 to 50° C.: 0.02 ppm $K^{-1}$), Neoceram (registered trademark; average thermal expansion coefficient at 30 to 380° C.: 0.00 ppm $K^{-1}$), and CLEARCERAM (registered trademark; average thermal expansion coefficient at 0 to 50° C.: 0.00±0.01 ppm $K^{-1}$). Examples of the negative expansion material include a/bismuth-lanthanum-nickel compound (average thermal expansion coefficient at 1 to 30° C.: –82 ppm $K^{-1}$) and a bismuth-nickel-iron oxide $BiNi_{1-x}Fe_xO_3$ (average thermal expansion coefficient at 1 to 30° C.: –187 ppm/K) having a perovskite structure. The substrate 10 may have a curved surface or may be processed into a given shape. The surface of the substrate 10 may be a smooth surface or a rough surface.

EXAMPLES

The present invention will be described in more detail by examples. The present invention is not limited to the examples given below. First, methods for evaluating resin compositions and cured products according to Examples and Reference Examples will be described.

[Analysis by ATR]

For resin compositions and cured products according to Examples and Reference Examples, infrared absorption spectra were measured by ATR using a Fourier transform infrared spectrophotometer (manufactured by PerkinElmer, product name: Frontier Gold). The infrared absorption spectrum of each cured product was measured using 10 mg of a powder specimen obtained by separating the cured product stacked on a glass substrate. The measurement results for the infrared absorption spectra of the resin composition and the cured product according to Example 1 are shown in FIG. 2 and FIG. 3.

In the infrared absorption spectra of the cured products according to Examples and Reference Examples, a local maximum of absorbance in an absorption band derived from a bond (siloxane bond) between one oxygen atom and two silicon atoms appeared in the wavenumber range of 800±50 $cm^{-1}$. A local maximum of absorbance in an absorption band derived from a hydrocarbon group ($CH_3$ and $CH_2$) appeared in the wavenumber range of 2940±50 $cm^{-1}$. A local maximum of absorbance in an absorption band derived from a hydroxy group appeared in the wavenumber range of 3460±100 $cm^{-1}$. A local maximum of absorbance in an absorption band derived from an oxetanyl group appeared in the wavenumber range of 980±50 $cm^{-1}$. A local maximum of absorbance in an absorption band derived from a bond between a silicon atom and a non-reactive functional group appeared in the wavenumber range of 1260±50 $cm^{-1}$.

Figure 2:
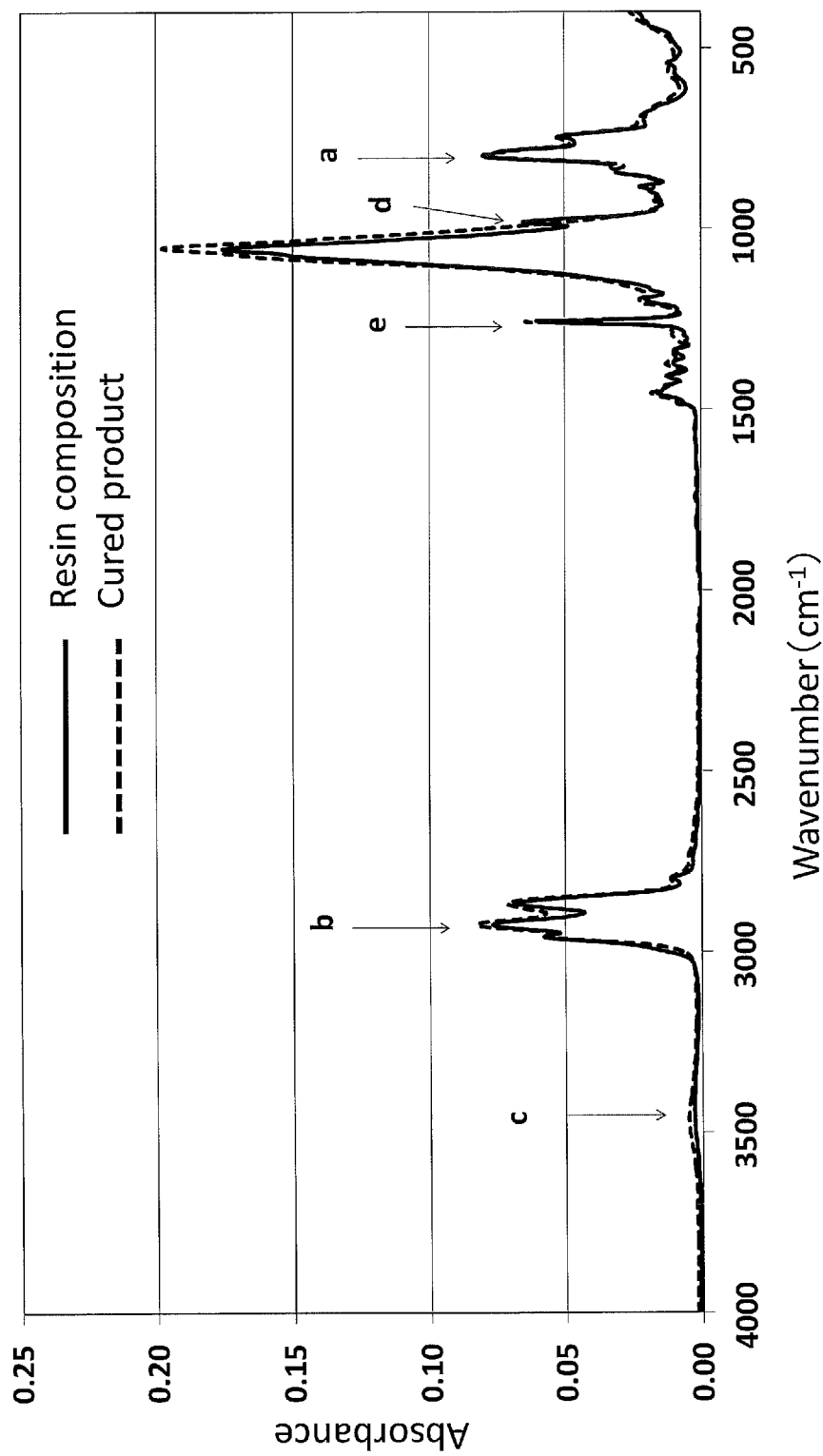
FIG. 2 is a graph showing absorption spectra determined by attenuated total reflection (ATR) for a resin composition and a cured product according to Example.
Figure 3:
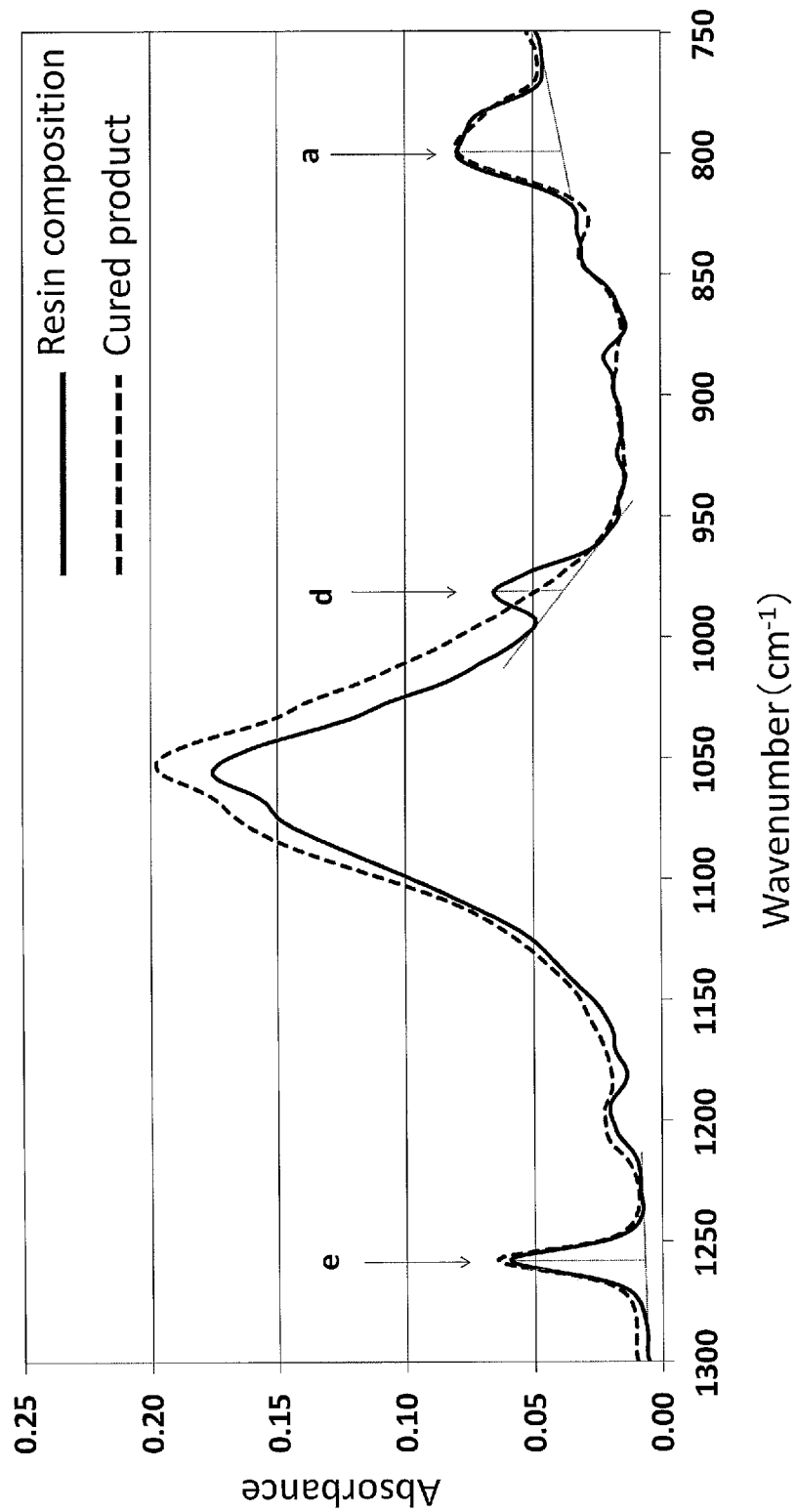
FIG. 3 is a graph showing absorption spectra determined by ATR for the resin composition and the cured product according to Example.

In FIG. 2 and FIG. 3, the absorption band derived from a bond (siloxane bond) between one oxygen atom and two silicon atoms is indicated by a symbol a. In FIG. 2 and FIG. 3, the absorption band derived from a hydrocarbon group ($CH_3$ and $CH_2$) is indicated by a symbol b, the absorption band derived from a bond to a hydroxy group is indicated by a symbol c, the absorption band derived from an oxetanyl group is indicated by a symbol d, and the absorption band derived from a bond between a silicon atom and a non-reactive functional group is indicated by a symbol e. The absorbances Ia, Ib, Ic, Id, and Ie were determined in the infrared absorption spectra of the cured products according to Examples and Reference Examples. To determine the absorbances Ia, Id, and Ie, baselines were set as shown in FIG. 3. Then, absorbances on the baselines and at wavenumbers where the local maxima of absorbance in the absorption bands indicated by the symbols a, d, and e appeared were subtracted from the local maxima of absorbance in the absorption bands indicated by the symbols a, d, and e to determine the absorbances Ia, Id, and Ie, respectively. Additionally, the local maxima of absorbance in the absorption bands indicated by the symbols b and c were determined as the absorbances Ib and Ic, respectively. Based on the absorbances Ia, Ib, Ic, Id, and Ie, the inorganic-organic parameter (IO), the hydrophilicity parameter (H), the first polymerization degree parameter (C1), and the second polymerization degree parameter (C2) were determined in Examples from the formulae (4) to (7). The inorganic-organic parameter (IO) and the hydrophilicity parameter (H) were determined in Reference Examples. The results are shown in Table 2.

| Inorganic-organic parameter (IO)=Ia/Ib | Formula (4) |
| Hydrophilicity parameter (H)=Ic/Ib | Formula (5) |
| First polymerization degree parameter (C1)=Ia/Id | Formula (6) |
| Second polymerization degree parameter (C2)=Ie/Id | Formula (7) |

[Measurement of Average Thermal Expansion Coefficient]

The resin compositions according to Examples and Reference Examples were cured under the same conditions as the conditions for forming the cured products according to Examples and Comparative Examples to produce specimens for measuring average thermal expansion coefficients. Each specimen had a rectangular parallelepiped shape and was 10 mm×5 mm×5 mm in size. With the use of the specimen, the average thermal expansion coefficient α1 of the corresponding cured product at 30 to 200° C. was determined with a thermomechanical analyzer (manufactured by Rigaku Corporation, product name: TMA 8310) according to the test method specified in JIS K7197-1991 under a temperature rise condition set at 5° C./minute. In Examples and Reference Examples, values on catalogs provided by manufacturers were referred to for the average thermal expansion coefficients α3 of the substrates at 20 to 300° C.

[Heat Resistance Test]

A laminate according to each of Examples and Reference Examples was placed with its convex cured product facing a heat-generating face of a desktop lamp heating system (manufactured by ADVANCE RIKO, Inc., product name: MILA-5000), into which nitrogen was introduced at a flow rate of 2 L/minute. The internal temperature of the heating system was increased to 240° C. at a temperature rise rate of 1° C./minute, and the inside of the heating system was kept at 240° C. for 90 seconds. Then, the internal temperature of the heating system was increased to one of given peak temperatures (260° C. or more) at a temperature rise rate of 1° C./minute. The internal temperature of the heating system was kept at the peak temperature for a given period of time. Then, the internal temperature of the heating system was decreased to ordinary temperature at 1° C./minute. Thereafter, samples each having undergone such a heat resistance test in which a different one of the given peak temperatures was set were examined for a crack using a stereomicroscope at 20-fold magnification. Of peak temperatures to which samples confirmed not to have cracked had been exposed, the highest one was determined as a crack-resistant temperature Ta. Additionally, the height Hr of the convex cured product of each sample having undergone the heat resistance test was measured using a laser microscope (manufactured by Keyence Corporation, product name: VK-9510), and the shrinkage factor S was determined from the height Hi measured for the convex cured product of the sample before the heat resistance test and the height Hr according to the following formula (8).

$$S=100\times(Hi-Hr)/Hi[\%] \qquad (8)$$

In each of Examples and Reference Examples, the heat resistance was evaluated as follows for the cured product according to each of Examples and Reference Examples based on the crack-resistant temperature Tα and the highest peak temperature Tβ of peak temperatures to which samples having a shrinkage factor of 5% or less were exposed. The results are shown in Table 2.

a: Both Tα and Tβ are 400° C. or more.
b: Both Tα and Tβ are 360° C. or more, and either Tα or Tβ is less than 400° C.
c: Both Tα and Tβ are 300° C. or more, and either Tα or Tβ is less than 360° C.
d: Both Tα and Tβ are 260° C. or more, and either Tα or Tβ is less than 300° C.
f: Either Tα or Tβ is less than 260° C.

[Preparation of Resin Composition]

A silsesquioxane Sq (a mixture of the silsesquioxane represented by the above formula (1-1) and the silsesquioxane represented by the above formula (1-2)) including an oxetanyl group and a silsesquioxane SqS (the silsesquioxane represented by the above formula (1-5)) having an oxetanyl group and a silicone chain were prepared. The oxetanyl group equivalent of the silsesquioxane Sq was 209, and the oxetanyl group equivalent of the silsesquioxane SqS was 262. In addition, a composition Ep1 including the alicyclic epoxide represented by the above formula (2-1), a composition Ep2 including the alicyclic epoxide represented by the above formula (2-5), and a composition EpS including the alicyclic epoxide having a silicone chain and represented by the above formula (3-1) were prepared. The epoxy equivalent of the composition Ep1 was 100, the epoxy equivalent of the composition Ep2 was 126, and the epoxy equivalent of the composition EpS was 290. A commercially-available photopolymerization initiator was also prepared.

Figure 4:
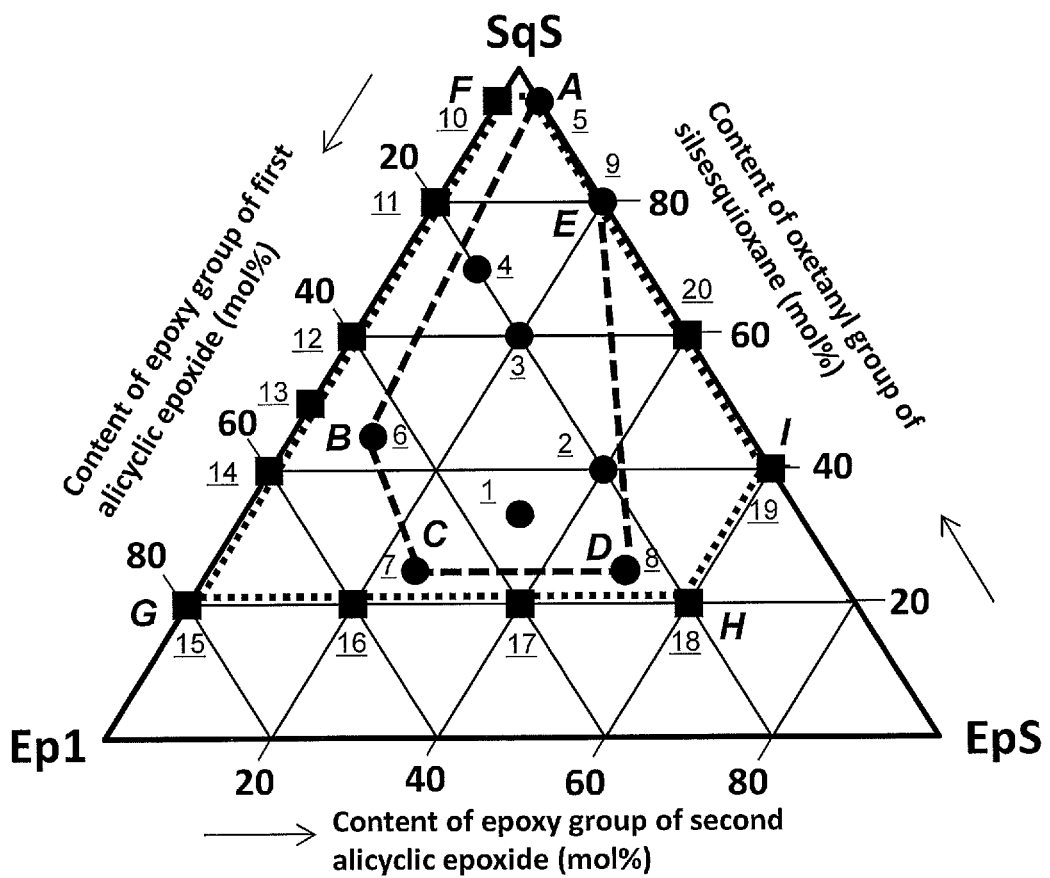
FIG. 4 is a ternary diagram showing composition ratios of an oxetanyl group of silsesquioxane to a first epoxy group to a second epoxy group on a mol % basis for resin compositions according to Examples and Reference Examples.
Figure 5:
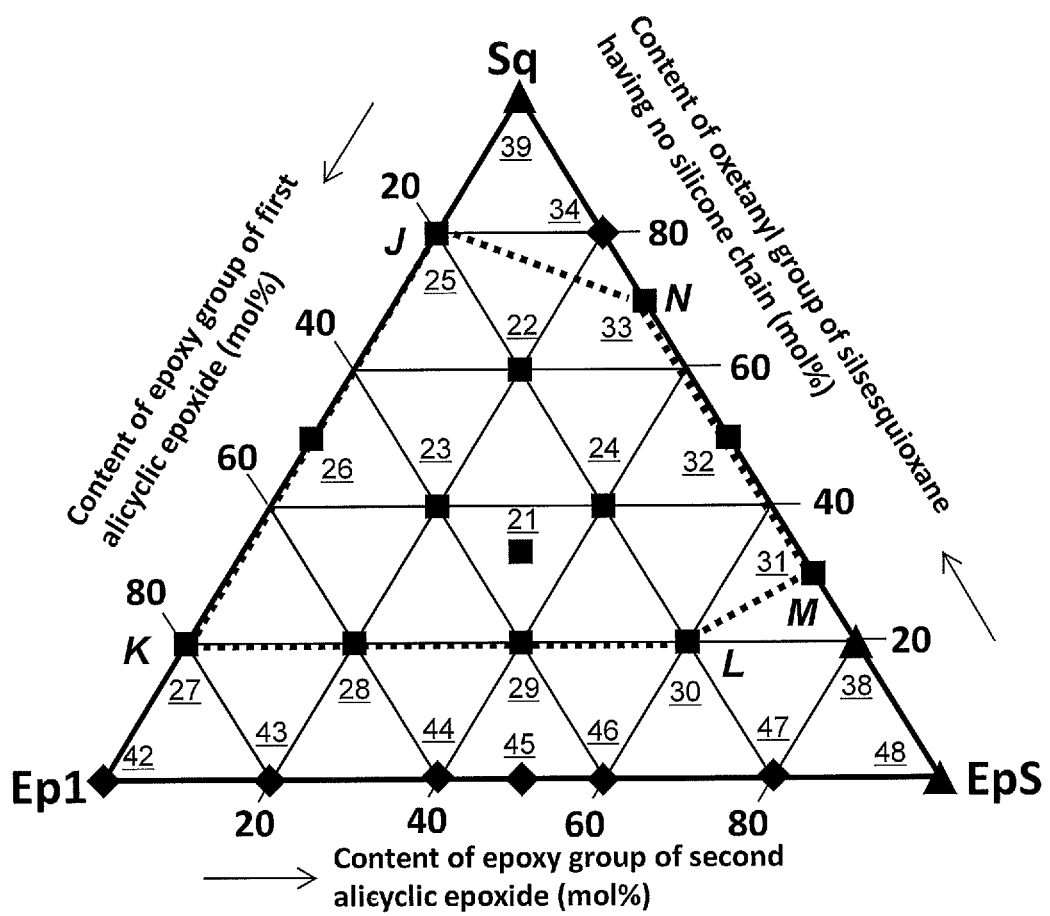
FIG. 5 is a ternary diagram showing composition ratios of an oxetanyl group of silsesquioxane to the first epoxy group to the second epoxy group on a mol % basis for resin compositions according to Examples and Reference Examples.

At least one of the silsesquioxane Sq, the silsesquioxane SqS, the composition Ep1, the composition Ep2, and the composition EpS was put in a lightproof container (made of polypropylene, internal volume: 100 mL) so that the weight ratio of the silsesquioxane Sq to the silsesquioxane SqS to the composition Ep1 to the composition Ep2 to the composition EpS would be as shown in Table 1. The weight of the contents in the container was adjusted to 5 g. Next, the contents in the container were mixed and stirred using a planetary centrifugal mixer (manufactured by THINKY CORPORATION, product name: ARV-310) for 10 minutes. A resin composition according to each of Examples and Reference Examples was thus obtained. For the resin compositions according to Examples and Reference Examples, composition ratios of the oxetanyl group included in the silsesquioxane Sq or the silsesquioxane SqS to the epoxy group included in the composition Ep1 or the composition Ep2 to the epoxy group included in the composition EpS on an amount-of-substance basis are shown in Table 1, FIG. 4, and FIG. 5. In FIG. 4 and FIG. 5, points A to N represent the following composition ratios, and 1 to 48 represent composition ratios for samples shown in Table 1 and Table 2 with sample numbers 1 to 48.

Point A: The content of the oxetanyl group is 95%, the content of the epoxy group in the composition Ep1 or the composition Ep2 is 0%, and the content of the epoxy group in the composition EpS is 5%.

Point B: The content of the oxetanyl group is 45%, the content of the epoxy group in the composition Ep1 or the composition Ep2 is 45%, and the content of the epoxy group in the composition EpS is 10%.

Point C: The content of the oxetanyl group is 25%, the content of the epoxy group in the composition Ep1 or the composition Ep2 is 50%, and the content of the epoxy group in the composition EpS is 25%.

Point D: The content of the oxetanyl group is 25%, the content of the epoxy group in the composition Ep1 or the composition Ep2 is 25%, and the content of the epoxy group in the composition EpS is 50%.

Point E: The content of the oxetanyl group is 80%, the content of the epoxy group in the composition Ep1 or the composition Ep2 is 0%, and the content of the epoxy group in the composition EpS is 20%.

Point F: The content of the oxetanyl group is 95%, the content of the epoxy group in the composition Ep1 or the composition Ep2 is 5%, and the content of the epoxy group in the composition EpS is 0%.

Point G: The content of the oxetanyl group is 20%, the content of the epoxy group in the composition Ep1 or the composition Ep2 is 80%, and the content of the epoxy group in the composition EpS is 0%.

Point H: The content of the oxetanyl group is 20%, the content of the epoxy group in the composition Ep1 or the composition Ep2 is 20%, and the content of the epoxy group in the composition EpS is 60%.

Point I: The content of the oxetanyl group is 40%, the content of the epoxy group in the composition Ep1 or the composition Ep2 is 0%, and the content of the epoxy group in the composition EpS is 60%.

Point J: The content of the oxetanyl group is 80%, the content of the epoxy group in the composition Ep1 or the composition Ep2 is 20%, and the content of the epoxy group in the composition EpS is 0%.

Point K: The content of the oxetanyl group is 20%, the content of the epoxy group in the composition Ep1 or the composition Ep2 is 80%, and the content of the epoxy group in the composition EpS is 0%.

Point L: The content of the oxetanyl group is 20%, the content of the epoxy group in the composition Ep1 or the composition Ep2 is 20%, and the content of the epoxy group in the composition EpS is 60%.

Point M: The content of the oxetanyl group is 30%, the content of the epoxy group in the composition Ep1 or the composition Ep2 is 0%, and the content of the epoxy group in the composition EpS is 70%.

Point N: The content of the oxetanyl group is 70%, the content of the epoxy group in the composition Ep1 or the composition Ep2 is 0%, and the content of the epoxy group in the composition EpS is 30%.

[Preparation of Substrate]

An aqueous silane coupling agent solution (concentration of silane coupling agent: 0.1 wt %) was applied to a principal surface of a glass substrate (product name: D263 T eco; average thermal expansion coefficient at 20 to 300° C.: 7.2 ppm $K^{-1}$; dimensions: 100 mm×100 mm×0.55 mm) made of borosilicate glass using a spin coater (manufactured by Mikasa Co., Ltd., product name: MS-A200). The resulting film was dried in an oven at 80° C. for 30 minutes. In the same manner, the aqueous silane coupling agent solution was applied to a glass substrate (average thermal expansion coefficient at 20 to 320° C.: 0.55 ppm $K^{-1}$) made of quartz glass and a glass substrate (average thermal expansion coefficient at 20 to 300° C.: 9 ppm $K^{-1}$) made of float glass (FG) and the resulting films were dried.

[Production of Laminate]

A mold release agent was applied to a transfer surface of a mold. Each of the glass substrates was pressed against the mold. In this state, the resin composition according to each of Examples and Reference Examples was dropped onto the transfer surface of the mold. The resin composition dropped was pressed and spread to form a film having a thickness of 0.04 mm. Next, this film was irradiated with ultraviolet light with an energy flux of 25 mW/cm$^2$ for 300 seconds using a metal halide lamp. Then, the mold was taken off, and the glass substrate taken out of the mold was placed in an oven set at 160° C. for 30 minutes. A convex cured product having a thickness of about 0.060 mm was thus formed on the glass substrate. Then, a 10 mm×10 mm piece was cut out of the glass substrate using a glass cutter. A laminate according to each of Examples and Comparative Examples was thus obtained. D263 T eco was used as glass substrates of the samples No. 1 to 39 and the samples No. 42 to 49, the glass substrate made of quartz glass was used as a glass substrate of the sample No. 40, and the glass substrate made of float glass was used as a glass substrate of the sample No. 41. The samples No. 1 to 41 are of Examples while the samples No. 42 to 49 are of Reference Examples.

For the laminates according to Examples corresponding to the samples No. 1 to 41, the relationships $\alpha1/\alpha3 \geq 10$ and $(\alpha1-\alpha3)^2 \times 10^8 \geq 0.4$ were satisfied. For the laminates according to Reference Examples corresponding to the samples No. 42 to 49, relationships $\alpha1/\alpha3 < 10$ and $(\alpha1-\alpha3)^2 \times 10^8 < 0.4$ were satisfied. For the cured products according to Examples corresponding to the samples No. 1 to 9, 40, and 41, the hydrophilicity parameter (H) satisfied the requirement $0.06 \leq Ic/Ib \leq 0.08$, the inorganic-organic parameter (IO) satisfied the requirement $0.09 \leq Ia/Ib \leq 3.0$, the first polymerization degree parameter (C1) satisfied the requirement $Ia/Id \geq 47$, and the second polymerization degree parameter (C2) satisfied the requirement $Ie/Id \geq 59$. In the heat resistance test in which the peak temperature was set to 400° C., the cured products according to these Examples did not crack and the shrinkage factors thereof were 5% or less.

For the cured products according to Examples corresponding to the samples No. 10 to 33, the hydrophilicity parameter (H) satisfied the requirement $0.04 \leq Ic/Ib \leq 1.0$, the inorganic-organic parameter (IO) satisfied the requirement $0.09 \leq Ia/Ib \leq 3.0$, and the first polymerization degree parameter (C1) satisfied a requirement $Ia/Id \geq 1.2$. In the heat resistance test at 360° C., the cured products according to these Examples did not crack and the shrinkage factors thereof were 5% or less.

For the cured products according to Examples corresponding to the samples No. 34 to 37, the hydrophilicity parameter (H) satisfied the requirement $0.04 \leq Ic/Ib \leq 1.0$ and the inorganic-organic parameter (IO) satisfied the requirement $0.09 \leq Ia/Ib \leq 3.0$. In the heat resistance test at 300° C., the cured products according to these Examples did not crack and the shrinkage factors thereof were 5% or less.

In the heat resistance test at 260° C., the cured products according to Examples corresponding to the samples No. 38 and 39 did not crack and the shrinkage factors thereof were 5% or less.

TABLE 1

| Sample No. | Substrate | Molar ratio of functional groups | | | Weight ratio (%) | | | | | Epoxy ratio (weight ratio) (Ep1 + Ep2 + EpS)/(Sq + SqS) |
|---|---|---|---|---|---|---|---|---|---|---|
| | | Oxetanyl group | Epoxy group of Ep1 or Ep2 | Epoxy group of EpS | Silsesquioxane | | Epoxide | | | |
| | | | | | Sq | SqS | Ep1 | Ep2 | EpS | |
| 1 | D263 | 1 | 1 | 1 | 0 | 40.2 | 15.3 | 0 | 44.5 | 1.49 |
| 2 | D263 | 40 | 20 | 40 | 0 | 43.5 | 8.3 | 0 | 48.2 | 1.30 |
| 3 | D263 | 60 | 20 | 20 | 0 | 66.8 | 8.5 | 0 | 24.7 | 0.50 |
| 4 | D263 | 70 | 20 | 10 | 0 | 78.9 | 8.6 | 0 | 12.5 | 0.27 |
| 5 | D263 | 95 | 0 | 5 | 0 | 94.5 | 0 | 0 | 5.5 | 0.06 |
| 6 | D263 | 45 | 45 | 10 | 0 | 61.4 | 23.4 | 0 | 15.1 | 0.63 |
| 7 | D263 | 25 | 50 | 25 | 0 | 34.8 | 26.6 | 0 | 38.6 | 1.87 |
| 8 | D263 | 25 | 25 | 50 | 0 | 27.8 | 10.6 | 0 | 61.6 | 2.60 |
| 9 | D263 | 80 | 0 | 20 | 0 | 78.3 | 0 | 0 | 21.7 | 0.28 |
| 10 | D263 | 95 | 5 | 0 | 0 | 98.0 | 2.0 | 0 | 0 | 0.02 |
| 11 | D263 | 80 | 20 | 0 | 0 | 91.3 | 8.7 | 0 | 0 | 0.10 |
| 12 | D263 | 60 | 40 | 0 | 0 | 79.7 | 20.3 | 0 | 0 | 0.25 |
| 13 | D263 | 50 | 50 | 0 | 0 | 72.4 | 27.6 | 0 | 0 | 0.38 |
| 14 | D263 | 40 | 60 | 0 | 0 | 63.6 | 36.4 | 0 | 0 | 0.57 |
| 15 | D263 | 20 | 80 | 0 | 0 | 39.6 | 60.4 | 0 | 0 | 1.53 |
| 16 | D263 | 20 | 60 | 20 | 0 | 30.8 | 35.2 | 0 | 34.0 | 2.25 |
| 17 | D263 | 20 | 40 | 40 | 0 | 25.1 | 19.2 | 0 | 55.7 | 2.98 |
| 18 | D263 | 20 | 20 | 60 | 0 | 21.3 | 8.1 | 0 | 70.6 | 3.70 |
| 19 | D263 | 40 | 0 | 60 | 0 | 37.6 | 0 | 0 | 62.4 | 1.66 |
| 20 | D263 | 60 | 0 | 40 | 0 | 57.5 | 0 | 0 | 42.5 | 0.74 |
| 21 | D263 | 1 | 1 | 1 | 34.9 | 0 | 16.7 | 0 | 48.4 | 1.87 |
| 22 | D263 | 60 | 20 | 20 | 61.7 | 0 | 9.8 | 0 | 28.5 | 0.62 |

TABLE 1-continued

| | | Molar ratio of functional groups | | | Weight ratio (%) | | | | | Epoxy ratio (weight ratio) |
|---|---|---|---|---|---|---|---|---|---|---|
| | | | Epoxy group of | Epoxy group | Silsesquioxane | | Epoxide | | | (Ep1 + Ep2 + |
| Sample No. | Substrate | Oxetanyl group | Ep1 or Ep2 | of EpS | Sq | SqS | Ep1 | Ep2 | EpS | EpS)/(Sq + SqS) |
| 23 | D263 | 40 | 40 | 20 | 46.0 | 0 | 22.0 | 0 | 31.9 | 1.17 |
| 24 | D263 | 40 | 20 | 40 | 38.1 | 0 | 9.1 | 0 | 52.8 | 1.63 |
| 25 | D263 | 80 | 20 | 0 | 89.3 | 0 | 10.7 | 0 | 0 | 0.12 |
| 26 | D263 | 50 | 50 | 0 | 67.6 | 0 | 32.4 | 0 | 0 | 0.48 |
| 27 | D263 | 20 | 80 | 0 | 34.3 | 0 | 65.7 | 0 | 0 | 1.91 |
| 28 | D263 | 20 | 60 | 20 | 26.2 | 0 | 37.5 | 0 | 36.3 | 2.82 |
| 29 | D263 | 20 | 40 | 40 | 21.1 | 0 | 20.2 | 0 | 58.6 | 3.73 |
| 30 | D263 | 20 | 20 | 60 | 17.7 | 0 | 8.5 | 0 | 73.8 | 4.64 |
| 31 | D263 | 30 | 0 | 70 | 23.6 | 0 | 0 | 0 | 76.4 | 3.24 |
| 32 | D263 | 50 | 0 | 50 | 41.9 | 0 | 0 | 0 | 58.1 | 1.39 |
| 33 | D263 | 70 | 0 | 30 | 62.7 | 0 | 0 | 0 | 37.3 | 0.59 |
| 34 | D263 | 80 | 0 | 20 | 74.2 | 0 | 0 | 0 | 25.8 | 0.35 |
| 35 | D263 | 1 | 1 | 1 | 0 | 38.6 | 0 | 18.6 | 42.8 | 1.59 |
| 36 | D263 | 1 | 0 | 0 | 0 | 100.0 | 0 | 0.0 | 0 | 0 |
| 37 | D263 | 50 | 50 | 0 | 0 | 67.5 | 0 | 32.5 | 0 | 0.48 |
| 38 | D263 | 20 | 0 | 80 | 15.3 | 0 | 0 | 0.0 | 84.7 | 5.55 |
| 39 | D263 | 1 | 0 | 0 | 100 | 0 | 0 | 0 | 0 | 0 |
| 40 | Quartz | 1 | 1 | 1 | 0 | 40.2 | 15.3 | 0 | 44.5 | 1.49 |
| 41 | FG | 1 | 1 | 1 | 0 | 40.2 | 15.3 | 0 | 44.5 | 1.49 |
| 42 | D263 | 0 | 1 | 0 | 0 | 0 | 100 | 0 | 0 | — |
| 43 | D263 | 0 | 80 | 20 | 0 | 0 | 58 | 0 | 42 | — |
| 44 | D263 | 0 | 60 | 40 | 0 | 0 | 34.1 | 0 | 65.9 | — |
| 45 | D263 | 0 | 50 | 50 | 0 | 0 | 25.6 | 0 | 74.4 | — |
| 46 | D263 | 0 | 40 | 60 | 0 | 0 | 18.7 | 0 | 81.3 | — |
| 47 | D263 | 0 | 20 | 80 | 0 | 0 | 7.9 | 0 | 92.1 | — |
| 48 | D263 | 0 | 0 | 1 | 0 | 0 | 0 | 0 | 100 | — |
| 49 | D263 | 0 | 1 | 0 | 0 | 0 | 0 | 100 | 0 | — |

TABLE 2

| | Inorganic organic parameter IO | Hydrophilicity parameter H | Polymerization degree parameters C1 and C2 | | Average thermal expansion coefficient (CTE) (ppm/K) | | CTE ratio |
|---|---|---|---|---|---|---|---|
| Sample No. | Ia/Ib | Ic/Ib | Ia/Id | Ie/Id | Cured product α1 | Substrate α3 | α1/α3 |
| 1 | 0.53 | 0.06 | 56 | 121 | 106 | 7.2 | 14.8 |
| 2 | 0.49 | 0.06 | 425 | 510 | 109 | 7.2 | 15.1 |
| 3 | 0.46 | 0.07 | 56 | 475 | 130 | 7.2 | 18.1 |
| 4 | 0.60 | 0.08 | 73 | 270 | 141 | 7.2 | 19.7 |
| 5 | 1.01 | 0.07 | 51 | 64 | 155 | 7.2 | 21.5 |
| 6 | 0.92 | 0.07 | 47 | 59 | 125 | 7.2 | 17.7 |
| 7 | 0.31 | 0.08 | 60 | 100 | 101 | 7.2 | 14.3 |
| 8 | 0.57 | 0.07 | 60 | 475 | 95 | 7.2 | 13.1 |
| 9 | 0.89 | 0.06 | 150 | 118 | 140 | 7.2 | 19.4 |
| 10 | 0.56 | 0.09 | 45 | 53 | 158 | 7.2 | 22.0 |
| 11 | 0.74 | 0.09 | 90 | 65 | 152 | 7.2 | 21.3 |
| 12 | 0.50 | 0.09 | 60 | 82 | 142 | 7.2 | 20.0 |
| 13 | 0.40 | 0.10 | 60 | 54 | 135 | 7.2 | 19.2 |
| 14 | 0.33 | 0.10 | 160 | 138 | 127 | 7.2 | 18.2 |
| 15 | 0.18 | 0.10 | 107 | 77 | 106 | 7.2 | 15.5 |
| 16 | 0.25 | 0.09 | 260 | 330 | 98 | 7.2 | 13.9 |
| 17 | 0.34 | 0.09 | 95 | 458 | 93 | 7.2 | 12.9 |
| 18 | 0.55 | 0.05 | 67 | 625 | 89 | 7.2 | 12.2 |
| 19 | 0.62 | 0.04 | 167 | 213 | 104 | 7.2 | 14.2 |
| 20 | 0.74 | 0.05 | 67 | 575 | 122 | 7.2 | 16.7 |
| 21 | 0.30 | 0.09 | 43 | 5 | 87 | 7.2 | 12.1 |
| 22 | 0.21 | 0.09 | 5.1 | 1.8 | 101 | 7.2 | 14.0 |
| 23 | 0.18 | 0.09 | 4.4 | 2.9 | 93 | 7.2 | 12.9 |
| 24 | 0.35 | 0.09 | 4.7 | 4.0 | 89 | 7.2 | 12.4 |
| 25 | 0.13 | 0.09 | 1.2 | — | 115 | 7.2 | 15.9 |
| 26 | 0.10 | 0.09 | 1.4 | — | 104 | 7.2 | 14.4 |
| 27 | 0.09 | 0.10 | 4.0 | — | 87 | 7.2 | 12.1 |
| 28 | 0.17 | 0.10 | 6.3 | 7.8 | 83 | 7.2 | 11.5 |
| 29 | 0.34 | 0.09 | 10.0 | 10.0 | 81 | 7.2 | 11.2 |
| 30 | 0.54 | 0.09 | 16.0 | 12.3 | 79 | 7.2 | 11.0 |

TABLE 2-continued

| | | | | | | | |
|---|---|---|---|---|---|---|---|
| 31 | 0.79 | 0.09 | 1.8 | 6.9 | 82 | 7.2 | 11.4 |
| 32 | 0.50 | 0.09 | 35.0 | 24.2 | 91 | 7.2 | 12.6 |
| 33 | 0.30 | 0.09 | 2.4 | 10.8 | 101 | 7.2 | 14.1 |
| 34 | 0.21 | 0.09 | 1.4 | 1.0 | 107 | 7.2 | 14.9 |
| 35 | 0.17 | 0.14 | 42 | 15.5 | 103 | 7.2 | 14.3 |
| 36 | 1.07 | 0.09 | 34 | 25.0 | 160 | 7.2 | 22.2 |
| 37 | 0.10 | 0.21 | 0.9 | — | 101 | 7.2 | 14.0 |
| 38 | 0.54 | 0.09 | 16.0 | 12.3 | 78 | 7.2 | 10.8 |
| 39 | 0.20 | 0.09 | 1.0 | — | 120 | 7.2 | 16.7 |
| 40 | 0.55 | 0.06 | 55 | 122 | 106 | 0.6 | 193.0 |
| 41 | 0.53 | 0.07 | 57 | 129 | 106 | 9.0 | 11.8 |
| 42 | 0.07 | 0.01 | — | — | 70 | 7.2 | 9.7 |
| 43 | 0.11 | 0.27 | — | — | 70 | 7.2 | 9.7 |
| 44 | 0.20 | 0.21 | — | — | 70 | 7.2 | 9.7 |
| 45 | 0.40 | 0.10 | — | — | 70 | 7.2 | 9.7 |
| 46 | 0.25 | 0.14 | — | — | 70 | 7.2 | 9.7 |
| 47 | 0.36 | 0.08 | — | — | 70 | 7.2 | 9.7 |
| 48 | 0.44 | 0.02 | — | — | 70 | 7.2 | 9.7 |
| 49 | 0 | 0.34 | — | — | 70 | 7.2 | 9.7 |

| Sample No. | $(\alpha 1 - \alpha 3)^2 \times 10^8$ | Crack-resistant temperature $T\alpha$ (° C.) | Shrinkage factor S (%) | | | | Evaluation of heat resistance |
|---|---|---|---|---|---|---|---|
| | | | 260° C. | 300° C. | 360° C. | 400° C. | |
| 1 | 0.98 | >400 | 0 | 0.1 | 0.3 | 3.5 | a |
| 2 | 1.04 | >400 | 0 | 0.1 | 0.7 | 3.7 | a |
| 3 | 1.51 | >400 | 0.1 | 0.2 | 0.9 | 3.8 | a |
| 4 | 1.79 | >400 | 0.1 | 0.2 | 0.9 | 3.9 | a |
| 5 | 2.19 | >400 | 0.1 | 0.1 | 0.9 | 4.2 | a |
| 6 | 1.39 | >400 | 0.2 | 0.2 | 0.6 | 4.7 | a |
| 7 | 0.89 | >400 | 0.7 | 0.8 | 1.6 | 4.2 | a |
| 8 | 0.77 | >400 | 0.5 | 0.9 | 1.2 | 4.8 | a |
| 9 | 1.78 | >400 | 0.2 | 0.2 | 0.9 | 4.1 | a |
| 10 | 2.28 | 370 | 0.2 | 0.2 | 0.9 | 5.7 | b |
| 11 | 2.10 | 380 | 0.5 | 0.5 | 0.4 | 5.2 | b |
| 12 | 1.81 | 380 | 0.5 | 0.5 | 0.9 | 6.2 | b |
| 13 | 1.64 | 380 | 0 | 0 | 0.7 | 6.5 | b |
| 14 | 1.44 | 380 | 0 | 0 | 0.4 | 7.6 | b |
| 15 | 0.97 | 370 | 0 | 0 | 0.6 | 10.1 | b |
| 16 | 0.82 | 380 | 0.7 | 0.8 | 1.5 | 7.1 | b |
| 17 | 0.73 | 370 | 0.5 | 0.9 | 1.6 | 6.3 | b |
| 18 | 0.67 | 370 | 0.2 | 0.6 | 1.4 | 6.1 | b |
| 19 | 0.93 | 390 | 0.1 | 0.1 | 1.7 | 5.5 | b |
| 20 | 1.31 | 390 | 0.2 | 0.2 | 2.6 | 3.8 | b |
| 21 | 0.64 | 370 | 0.6 | 1.5 | 1.2 | 4.4 | b |
| 22 | 0.88 | 370 | 0.7 | 0.6 | 2.1 | 7.1 | b |
| 23 | 0.74 | 380 | 0.6 | 0.8 | 0.9 | 6.1 | b |
| 24 | 0.67 | 370 | 0 | 0.6 | 0.5 | 7.8 | b |
| 25 | 1.15 | 370 | 0 | 0.3 | 0.7 | 6.3 | b |
| 26 | 0.93 | 390 | 0 | 0.4 | 0.8 | 6.1 | b |
| 27 | 0.64 | 360 | 0 | 1.5 | 0.5 | 8.3 | b |
| 28 | 0.57 | 390 | 0.8 | 2.5 | 3.2 | 15 | b |
| 29 | 0.54 | 390 | 0.8 | 2.9 | 4.1 | 18 | b |
| 30 | 0.51 | 390 | 0.8 | 2.8 | 4.3 | 19 | b |
| 31 | 0.56 | 360 | 1.5 | 2.3 | 4.7 | >20 | b |
| 32 | 0.70 | 360 | 2.1 | 2.6 | 4.1 | >20 | b |
| 33 | 0.89 | 360 | 2.0 | 3.2 | 3.9 | >20 | b |
| 34 | 1.00 | 310 | 0 | 0.5 | 3.2 | 4.8 | c |
| 35 | 0.92 | 370 | 1.2 | 3.2 | 6.4 | 7.4 | c |
| 36 | 2.33 | 350 | 0 | 0.4 | 0.9 | 5.9 | c |
| 37 | 0.87 | 310 | 1.0 | 3.2 | 3.4 | 10.3 | c |
| 38 | 0.50 | 360 | 2.0 | 5.7 | 9.5 | >20 | d |
| 39 | 1.27 | 290 | 0 | 0.5 | 1.0 | 4.8 | d |
| 40 | 1.12 | >400 | 0.1 | 0.4 | 0.8 | 4.2 | a |
| 41 | 0.94 | >400 | 0 | 0.2 | 0.8 | 4.3 | a |
| 42 | 0.39 | 350 | 0 | 0.1 | 2.5 | >20 | c |
| 43 | 0.39 | 340 | 0 | 0.2 | 0.8 | 4.3 | c |
| 44 | 0.39 | 330 | 0 | 2.5 | 4.3 | 12 | c |
| 45 | 0.39 | 330 | 0 | 2.5 | 4.3 | 12 | c |
| 46 | 0.39 | 360 | 2.0 | 3.0 | 8.5 | >20 | d |
| 47 | 0.39 | 310 | 7.0 | >20 | >20 | >20 | f |
| 48 | 0.39 | 400 | 2.0 | 6.0 | 8.6 | 13 | d |
| 49 | 0.39 | 360 | 8.9 | 19.0 | 27 | >20 | f |

The invention claimed is:

1. A cured product of a resin composition, the resin composition comprising a first silsesquioxane having a silicone chain and a plurality of oxetanyl group; a first alicyclic epoxide having a silicone chain and a plurality of first epoxy groups; and a polymerization initiator,
the cured product having an average thermal expansion coefficient $\alpha1$ [$K^{-1}$] in a temperature range of 30 to 200° C., the average thermal expansion coefficient a1 satisfying at least one of $\alpha1/\alpha2 \geq 10$ and $(\alpha1-\alpha2)^2 \times 10^8 \geq 0.4$, where a reference value $\alpha2$ is $350 \times 10^{-6}$ [$K^{-1}$] or less,
the cured product having an absorbance spectrum measured by a Fourier transform infrared spectrometer, the absorbance spectrum including an absorbance Ia derived from a siloxane bond in which two silicon atoms are bonded to one oxygen atom, an absorbance Ib derived from a hydrocarbon group, and an absorbance Ic derived from a hydroxyl group, wherein requirements $0.09 \leq Ia/Ib \leq 3.0$ and $0.04 \leq Ic/Ib \leq 1.0$ are satisfied.

2. The cured product according to claim 1, comprising a polymer including the first silsesquioxane.

3. The cured product according to claim 1, the absorbance spectrum including an absorbance Id derived from an oxetanyl group, wherein requirement $Ia/Id \geq 45$ is further satisfied.

4. The cured product according to claim 3, wherein a relationship $Ia/Id \geq 47$ is further satisfied.

5. The cured product according to claim 1, the absorbance spectrum including an absorbance Id derived from an oxetanyl group, and an absorbance Ie derived from a bond between a silicon atom and a non-reactive functional group, wherein a relationship $Ie/Id \geq 59$ is further satisfied.

6. The cured product according to claim 1, the resin composition optionally further comprising a second alicyclic epoxide having a plurality of second epoxy groups and no silicone chain, wherein
each content of the oxetanyl group of the first silsesquioxane, a second epoxy group of the second alicyclic epoxide, and a first epoxy group of the first alicyclic epoxide is in an area surrounded by five line segments connecting the following points in the following order in the ternary diagram on a mol % basis:
a point A at which the content of the oxetanyl group is 95%, the content of the second epoxy group is 0%, and the content of the first epoxy group is 5%;
a point B at which the content of the oxetanyl group is 45%, the content of the second epoxy group is 45%, and the content of the first epoxy group is 10%;
a point C at which the content of the oxetanyl group is 25%, the content of the second epoxy group is 50%, and the content of the first epoxy group is 25%;
a point D at which the content of the oxetanyl group is 25%, the content of the second epoxy group is 25%, and the content of the first epoxy group is 50%; and
a point E at which the content of the oxetanyl group is 80%, the content of the second epoxy group is 0%, and the content of the first epoxy group is 20%.

7. A laminate comprising:
a substrate having an average thermal expansion coefficient $\alpha3$ [$K^{-1}$] in a temperature range of 30 to 200° C., $\alpha3 \leq 350 \times 10^{-6}$ [$K^{-1}$]; and
the cured product according to claim 1, wherein least one of requirements $\alpha1/\alpha3 \geq 10$ and $(\alpha1-\alpha3)^2 \times 10^8 \geq 0.4$ is satisfied.

8. A resin composition comprising a first silsesquioxane having a silicone chain and a plurality of oxetanyl groups; a first alicyclic epoxide having a silicone chain and a plurality of first epoxy groups; and a polymerization initiator,
the resin composition being capable of becoming forming a cured product having an average thermal expansion coefficient $\alpha1$ [$K^{-1}$] in a temperature range of 30° C. to 200° C., the average thermal expansion coefficient a1 satisfying at least one of $\alpha1/\alpha2 \geq 10$ and $(\alpha1-\alpha2)^2 \times 10^8 > 0.4$, where a reference value $\alpha2$ is $350 \times 10^{-6}$ [K-1] or less,
the cured product having an absorbance spectrum measured by a Fourier transform infrared spectrometer, the absorbance spectrum including an absorbance Ia derived from a siloxane bond in which two silicon atoms are bonded to one oxygen atom, an absorbance Ib derived from a hydrocarbon group, and an absorbance Ic derived from a hydroxyl group, wherein
in the cured product, requirements $0.09 \leq Ia/Ib \leq 3.0$ and $0.04 \leq Ic/Ib \leq 1.0$ are satisfied.

9. The resin composition according to claim 8, comprising a polymer including the first silsesquioxane having the oxetanyl group.

10. The resin composition according to claim 8, the absorbance spectrum including an absorbance Id derived from an oxetanyl group, wherein in the cured product, a relationship $Ia/Id \geq 45$ is further satisfied.

11. The resin composition according to claim 10, wherein in the cured product, a relationship $Ia/Id \geq 47$ is further satisfied.

12. The resin composition according to claim 8, the absorbance spectrum including an absorbance Id derived from an oxetanyl group and an absorbance Ie derived from a bond between a silicon atom and a non-reactive functional group, wherein in the cured product, a relationship $Ie/Id \geq 59$ is further satisfied.

13. The resin composition according to claim 8, the resin composition optionally further comprising a second alicyclic epoxide having a plurality of second epoxy groups and no silicone chain, wherein
each content of the oxetanyl group, the second epoxy group of the second alicyclic epoxide, and the first epoxy group of the first alicyclic epoxide is in an area surrounded by five line segments connecting the following points in the following order in the ternary diagram on a mol % basis:
a point A at which the content of the oxetanyl group is 95%, the content of the second epoxy group is 0%, and the content of the first epoxy group is 5%;
a point B at which the content of the oxetanyl group is 45%, the content of the second epoxy group is 45%, and the content of the first epoxy group is 10%;
a point C at which the content of the oxetanyl group is 25%, the content of the second epoxy group is 50%, and the content of the first epoxy group is 25%;
a point D at which the content of the oxetanyl group is 25%, the content of the second epoxy group is 25%, and the content of the first epoxy group is 50%; and
a point E at which the content of the oxetanyl group is 80%, the content of the second epoxy group is 0%, and the content of the first epoxy group is 20%.

* * * * *